July 7, 1959  H. H. STERN ET AL  2,893,247
RATE GYRO WITH BUILT-IN VARIABLE WASHOUT
Filed Aug. 19, 1957
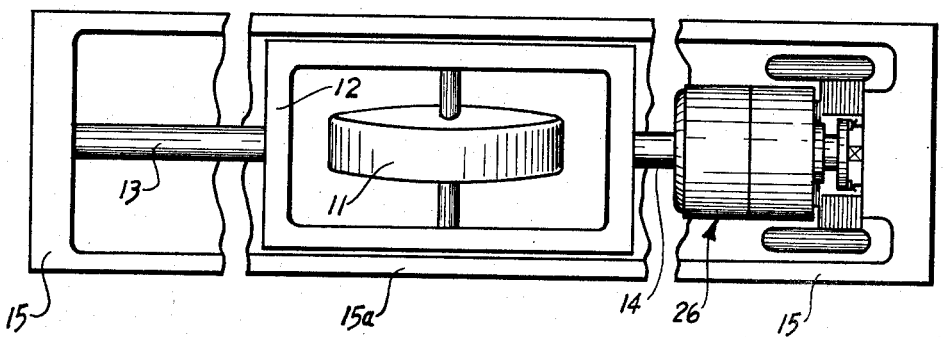
FIG_1
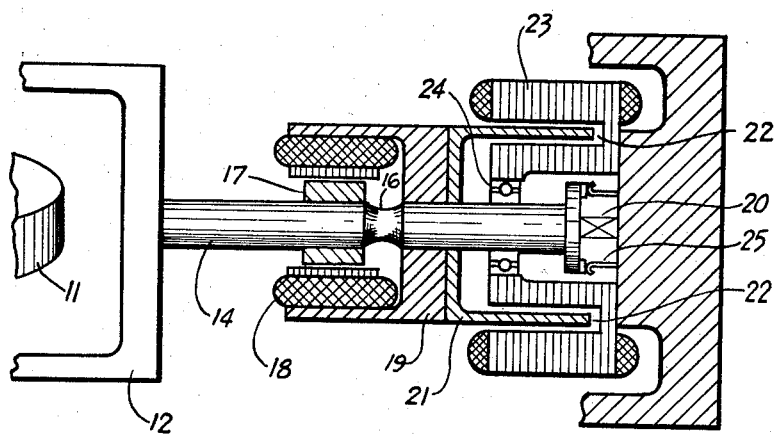
FIG_2
INVENTORS.
JOHN A. TURNER
HOWARD H. STERN
BY
ATTORNEY.

United States Patent Office 2,893,247
Patented July 7, 1959

2,893,247

RATE GYRO WITH BUILT-IN VARIABLE WASHOUT

Howard H. Stern and John A. Turner, San Diego, Calif., assignors to General Dynamics Corporation (Convair Division), San Diego, Calif., a corporation of Delaware Application August 19, 1957, Serial No. 678,772

5 Claims. (Cl. 74—5.6)

The present invention relates to a rate gyro with a built-in variable washout, and more particularly to a rate gyro whose output signal is sensitive to angular acceleration and less sensitive to the actual value of the angular rate or velocity itself.

In aircraft flight control systems it is common practice to washout the signal of a rate gyro. By this washout process two things are accomplished; the gyro output signal resulting from a steady rate input to the gyro is practically zero and high frequency inputs to the gyro are passed relatively unchanged while low frequency inputs appear greatly reduced in the output signal with an associated lag in time of response. Because of this, a washout is sometimes referred to as a "high pass." From this it can be seen that a steady angular velocity input will produce a negligible output signal, but if this velocity starts to change, causing the input to the gyro to become an angular acceleration, then the output signal may become appreciable, depending on how large the acceleration becomes.

This washout is normally accomplished by an external electrical network in the output circuit of the gyroscope. In order to do this electrically it is necessary to work on a D.C. signal. Since the output of the gyro is normally A.C. the signal must be converted to D.C. and then washed out electrically. It is generally necessary to reconvert the washed out signal back to A.C. because of the type of electrical devices and networks which are to receive the signal. In addition to this conversion from A.C. to D.C. and back to A.C., it is sometimes necessary to change the rate at which the signal is washed out, usually as a function of airspeed or altitude.

The invention disclosed herein is a rate gyro whose output signal is washed out within the gyro itself and without the aid of electrical networks. One of the items enclosed in the gyro is a pick-off. This device transforms mechanical motion into an electrical signal and is comprised, generally, of two major elements. Normally, one element is attached to a movable portion of the gyro and the other element is attached to the outer case of the gyro. Relative motion between the two elements is picked off or converted into an electrical signal. In this invention, however, neither element is attached to the outer case. The element normally attached to the outer case is now free to move with the other pick-off element.

This modification of the pick-off device coupled with the addition of a damping mechanism produces a gyro output signal which is washed out at the same time it is produced. The freedom of movement of the newly freed element is damped by the added damping mechanism. This damping may be varied in accordance with external parameters such as airspeed and altitude, thus the washout is made a function of these parameters. The output signal conversion from A.C. to D.C. back to A.C. is no longer necesasry and, thus, the electrical circuitry required for the conversions and washout is eliminated.

It is therefore an object of the invention to provide a rate gyro having a built in washout that is effected by the action of the gyro itself.

Another object is the provision of a rate gyro wherein washout can be effected without external A.C. to D.C. to A.C. conversion circuitry.

Another object is to provide a rate gyro having a built-in washout which can be varied in accordance with external parameters.

Other objects and features of the present invention will be readily apparent to those skilled in the art from the following specification and appended drawings wherein is illustrated a preferred form of the invention, and in which:

Figure 1 is a partial view of the general configuration of a gyro with a preferred embodiment of the present invention incorporated therein and, Figure 2 is a cross section view of the pick-off and damping mechanism.

The gyro shown in Figure 1 is a conventional rate gyro except for the pick-off and the addition of a pick-off damping means. The power driven rotor 11 is carried by the gimbal or rotor support 12 which in turn is supported by torsion bars or springs 13 and 14. The restraint 13 is attached to the outer case 15. This could, however, be a freely rotating member. The restraint 14, however, is not attached to the outer case. The portion of the outer case designated 15a is generally used to provide viscous damping of the gimbal or rotor support 12. This is accomplished by making the clearance between the rotor support 12 and the outer case 15a so small that movement between the rotor support and the outer case is viscously damped. At the one end of the gyro is the pick-off and pick-off damping means.

Figure 2 shows a pick-off rotor 17 and stator 18 of conventional design. The rotor 17 and stator support 19 are both attached to the torsion bar 14. The stator support is normally attached to the case in conventional rate gyros. A cup of electrically conducting material 21 is attached to the stator support 19 and protrudes into magnetic flux gaps 22 that exist in an electromagnet 23 which is attached to the outer case 15. The bearings 24 hold the torsion bar 14 in position but do not impose any restraint on the angular deflections or movements of the torsion bar. The reduced portion of the torsion bar, portion 16, is provided to increase relative motion between the pick-off rotor 17 and pick-off stator 18. Some connection between the gimbal 12 and the case 15 is needed to insure that the original "0" point is maintained. This "0" point refers to the original orientation of the gyro rotor support with respect to the gyro outer case. In this particular embodiment a weak precision spring 20 is placed between the end of the torsion bar 14 and the outer case 15. Conventional slip rings 25 are used as electrical connectors between external conductors and internal conductors and electrical gear.

This gyro operates just like a standard rate gyro except that the pick-off stator 18 which is normally fixed to the case 15 is now attached to the torsion bar 14. The movement of the stator is damped by the electromagnet 23 and the electrically conductive cup 21. This is a conventional means of damping and is sometimes referred to as "eddy current" damping. An input to the gyro causes the gimbal, or support, to move and twist the torsion bar 14. The relative movement between the rotor and the stator, which is enhanced by the cutout portion 16, produces an electrical output signal. This relative movement is controlled by the amount of damping applied to the stator. The damping, in turn, is dependent on the electrical current input to the electromagnet. The stator follows the rotor with a lag which is dependent upon how fast the gimbal twists and how much damping is applied. The damping allows the stator to rotate more freely under low frequency torque inputs than under high frequency torque inputs, causing the electrical output signal to be washed out when the lower frequency torque is applied. It should be noted that although the method for damping shown herein is magnetic it could also be mechanical, hydraulic, or of any other suitable nature. Since it is the relative movement between the rotor and stator which is important, the motion of the rotor could be damped instead of the motion of the stator and the same results would be achieved. If it is desired to vary the washout as a function of air speed, altitude or other parameter then a transducer which transforms the parameter into an electric current input to the electromagnet will make the washout a function of the parameter.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. A rate gyroscope comprising an outer case, a rotor support, a power driven rotor positioned in said support, an electromagnetic pick-off, said pick-off having a first element connected to move with said support and a second element connected to move with said first element but variably restrained from so doing, means connected between said first and second elements for permitting relative motion between said elements, and variable electromagnetic damping means attached to said second element and said gyro outer case for variably restraining movement of said second element, said first element and said restrained second element cooperating to produce an output signal variably dependent on angular acceleration inputs to said gyro.

2. A rate gyroscope comprising an outer case, a rotor support, a power driven rotor positioned in said support, an electromagnetic pick-off, said pick-off having a rotor connected to move with said support and a stator connected to move with said rotor but variably restrained from so doing, means connected between said rotor and said stator for permitting relative motion therebetween, and variable electromagnetic damping means attached to said stator and to said gyro outer case for variably restraining movement of said stator, said rotor and said restrained stator cooperating to produce an output signal variably dependent on angular acceleration inputs to said gyro.

3. A rate gyroscope comprising an outer case, a rotor support, a power driven rotor positioned in said support, an electromagnetic pick-off, said pick-off having a first element connected to move with said support and a second element connected to move with said first element but variably restrained from so doing, means connected between said first and second elements for permitting relative motion therebetween, and variable electromagnetic damping means for restraining movement of said second element, said means including an electromagnet attached to said outer case and an electrically conductive cup fixed to said second element of said pick-off, said first element and said variably restrained second element cooperating to produce an output signal variably dependent on angular acceleration inputs to said gyro.

4. A rate gyroscope comprising an outer case, a rotor support, a power driven rotor positioned in said support, an electromagnetic pick-off, said pick-off having a rotor connected to move with said support and a stator connected to move with said rotor but variably restrained from so doing, means connected between said rotor and said stator for permitting relative motion therebetween, and variable electromagnetic damping means for restraining movement of said stator, said means including an electromagnet attached to said outer case and an electrically conductive cup fixed to said stator, said rotor and said variably restrained stator cooperating to produce an output signal variably dependent on angular acceleration inputs to said gyro.

5. A rate gyroscope comprising an outer case, a rotor support, a power driven rotor positioned in said support, an electromagnetic pick-off, said pick-off having a rotor connected to move with said support and a stator connected to move with said rotor but variably restrained from so doing, a torsion bar connected between said rotor and said stator for permitting relative motion therebetween, and variable electromagnetic damping means for restraining movement of said stator, said means including an electromagnet attached to said outer case and an electrically conductive cup fixed to said stator, said rotor and said variably restrained stator cooperating to produce an output signal variably dependent on angular acceleration inputs to said gyro.

References Cited in the file of this patent

UNITED STATES PATENTS

| | | |
|---|---|---|
| 2,669,126 | Simmons et al. | Feb. 16, 1954 |
| 2,672,054 | Warren et al. | Mar. 16, 1954 |
| 2,766,627 | Lower et al. | Oct. 16, 1956 |
| 2,805,577 | Shomphe | Sept. 10, 1957 |